(12) United States Patent
Napravnik

(10) Patent No.: US 9,796,532 B2
(45) Date of Patent: Oct. 24, 2017

(54) DEVICE FOR POSITIONING AND/OR ORIENTING ONE OR MORE ADJUSTABLE DIRECTING COMPONENTS FOR GUIDING ARTICLES IN A TRANSPORT SYSTEM

(71) Applicant: KRONES Aktiengesellschaft, Neutraubling (DE)

(72) Inventor: Christian Napravnik, Rosenheim (DE)

(73) Assignee: KRONES Aktiengesellschaft, Neutraubling (DE)

( * ) Notice: Subject to any disclaimer, the term of this patent is extended or adjusted under 35 U.S.C. 154(b) by 0 days.

(21) Appl. No.: 14/771,657

(22) PCT Filed: Feb. 13, 2014

(86) PCT No.: PCT/EP2014/052846
§ 371 (c)(1),
(2) Date: Aug. 31, 2015

(87) PCT Pub. No.: WO2014/135352
PCT Pub. Date: Sep. 12, 2014

(65) Prior Publication Data
US 2016/0009498 A1   Jan. 14, 2016

(30) Foreign Application Priority Data
Mar. 6, 2013  (DE) .......... 10 2013 102 202

(51) Int. Cl.
*B65G 21/20* (2006.01)
*B65B 59/02* (2006.01)

(52) U.S. Cl.
CPC .......... *B65G 21/2072* (2013.01); *B65B 59/02* (2013.01); *B65G 2207/08* (2013.01)

(58) Field of Classification Search
CPC .. B65G 21/2072; B65G 2207/08; B65B 59/02
USPC .......................................... 198/836.3, 831.1
See application file for complete search history.

(56) References Cited

U.S. PATENT DOCUMENTS 2,951,574 A * 9/1960 Craig ................. B65G 21/2072
                                                    198/433
3,767,027 A * 10/1973 Pund ................. B65G 21/2072
                                                    198/434
4,880,104 A * 11/1989 Evans ................... B65B 59/005
                                                    198/445

(Continued)

FOREIGN PATENT DOCUMENTS

DE       19618373       5/1997
DE       29617148       10/1997

(Continued)

OTHER PUBLICATIONS

PCT/EP2014/052846—International Search Report dated May 6, 2014.

(Continued)

*Primary Examiner* — Gerald McClain
*Assistant Examiner* — Keith Campbell
(74) *Attorney, Agent, or Firm* — Simmons Perrine Moyer Bergman PLC

(57) ABSTRACT

Disclosed is a device (1) for positioning one or more adjustable directing components for guiding articles in a transport system. One or more of the directing components are coupled to at least one first output (7a to 7g) of a transmission arrangement (11) and can be positioned via the at least one first output (7a to 7g). One or more further directing components are coupled to at least one second output (7a to 7g) of the transmission (11) and coupled via at least one second output (7a to 7g) of the transmission (11) and can be positioned via the at least one second output (7a to 7g). The device (1) further comprises a control actuator (17), which can be selectively and mechanically brought into an operative connection with the at least one first output (7a to 7g) and/or with the at least one second output (7a to 7g).

20 Claims, 7 Drawing Sheets

(56) References Cited

U.S. PATENT DOCUMENTS

| | | | |
|---|---|---|---|
| 5,515,668 A * | 5/1996 | Hunt .................... | B65G 47/715 |
| | | | 198/446 |
| 6,209,707 B1 | 4/2001 | Ronchi | |
| 6,378,695 B1 * | 4/2002 | Rinne ................ | B65G 21/2072 |
| | | | 198/836.3 |
| 7,207,428 B2 | 4/2007 | Huttner | |
| 8,651,264 B2 * | 2/2014 | Spindler ............. | B65G 47/682 |
| | | | 198/442 |
| 8,770,392 B2 * | 7/2014 | Berger .................. | B65G 21/16 |
| | | | 198/813 |
| 2014/0110228 A1 | 4/2014 | Franzaroli | |

FOREIGN PATENT DOCUMENTS

| | | | |
|---|---|---|---|
| DE | 10146447 | 4/2003 | |
| DE | 202005001689 | 9/2005 | |
| EP | 1375393 | 1/2004 | |
| EP | 2571791 | 4/2014 | |
| IT | WO 2011145123 A1 * | 11/2011 | ......... B65G 21/2072 |
| JP | S5957812 | 4/1984 | |

OTHER PUBLICATIONS

DE 10 2013 102 202.2—German Search Report dated Oct. 23, 2013.

PCT/EP2014/052846—International Search Report dated May 6, 2014—English Translation.

Chinese Application No. 2014800124483—Chinese Office Action dated May 18, 2016.

* cited by examiner

DEVICE FOR POSITIONING AND/OR ORIENTING ONE OR MORE ADJUSTABLE DIRECTING COMPONENTS FOR GUIDING ARTICLES IN A TRANSPORT SYSTEM

PRIORITY CLAIM

The present application is a national stage application of International Application PCT/EP2014/052846, filed Feb. 13, 2014, which in turn claims priority to German Application DE 10 2013 102 202.2, filed Mar. 6, 2013, all of which are incorporated by reference.

FIELD OF INVENTION

The present invention relates to a device for positioning one or more adjustable directing components in a transport system.

BACKGROUND OF THE INVENTION

The transport systems as known from the prior art usually have lateral guide elements, such as railings or the like, the spacing or orientation of which have to be adjusted in dependence on the geometry of the articles to be transported. Such an adjustment was normally performed manually and with the aid of tools, as the case may be.

Since such a manual adjustment is time-consuming and since production or the transport have to be stopped during the adjustment, other devices are known from the prior art that allow adjusting the spacing of railings in a transport system with the aid of a motor.

Such an apparatus is for instance known from WO 03/099687 A1. In the transport system shown in the WO patent application, first guide rails are coupled to a motor. Arranged in a downstream section, there are additional guide rails, which are adjustable synchronously and equidistantly by means of a manual crank. For both the first guide rails and the following guide rails, respectively, it is necessary to operate a motor or a manual crank, in order to adjust the entire transport route to new container sizes.

SUMMARY OF THE INVENTION

The task of the invention is to provide a device that allows adjusting a plurality of directing components of a transport system in adaptation to the geometry of different articles in a facilitated manner and at a reduced input.

The above task is solved by a device comprising the features in the independent claims. Further advantageous embodiments of the invention are described in the dependent claims.

The device according to the invention is intended for positioning and/or orienting one or more adjustable directing components for steering or guiding articles in a transport system. For instance, the device can be designed for relative distance increase and relative distance decrease of at least two first and at least two second directing components. In the course of the transport route, the at least two first directing components can be arranged upstream or downstream of the at least two second directing components. In a first section of the transport route, articles can be steered or guided via the at least two first directing components, and they can be steered or guided via the at least two further directing components in a further section of the transport route.

In preferred embodiments, there is a plurality of further directing components, which extend over the entire course of the transport route and steer or guide the articles over the entire course of the transport route.

For further embodiments, it is conceivable that orientation or pivoting of a plurality of directing components can be effected by the device. In this instance, it is possible that an angle, which is enclosed by one or more of the directing components together with a transport plane, is selectively adjustable by means of the device. Additionally or alternatively, it is also possible for a vertical positioning of one or more directing components to be effected via the device.

It is clear to the expert that both a vertical positioning of one or more directing components and a relative distance increase and/or distance decrease of one or more directing components can be performed in various exemplary embodiments of the device according to the invention. Such possibilities will be referred to in the following in more detail.

The articles can be designed as containers or bottles, for instance, and they can be steered and/or guided between the directing components and along a transport route on a horizontal conveying device, as the case may be. In this instance, it is conceivable that respectively two first directing components, between which the respective articles are steered or guided, are at least section-wise oriented in parallel to each other. It is also conceivable that the articles are steered and/or guided in a straight line via at least two first directing components in a first section, and that the articles are steered an/or guided in a curved line via at least two second directing components in a further section. In this instance, it is possible that the relative distance of the at least two first directing components and the relative distance of the at least two second directing components are independent of each other by means of the device according to the invention.

It is also possible that the vertical positioning of one or more first directing components and the vertical positioning of one or more second and/or one or more further directing components is independent of each other in a defined manner by means of an embodiment of the device according to the invention.

The relative distance between the respective directing components should preferably be selected such that the articles are supported while being steered and/or guided by the directing components and such that the toppling of articles while being steered and/or guided by the directing components can be at least largely ruled out.

The device can be provided for orienting and/or positioning one or more adjustable directing components in a transport system as a constituent part of a packaging facility for articles and/or one or more adjustable directing components in a transport system as a constituent part of a filling facility for articles designed as containers with a liquid medium. If the transport system is designed as a constituent part of a packaging facility, it can be provided that packaging material is applied to the articles being respectively transported by the transport system while their transport is underway. The use of the transport system is not limited to such facilities, and the addressed expert can employ the transport system for other facilities.

According to the invention, one or more directing components are coupled to at least one first output of a transmission arrangement and can be positioned and/or oriented via the at least one first output. In this instance, it is possible that the at least one first output is coupled with the one or more directing components via one or more flexible cable elements, and in particular via a Bowden cable, a cable pull, or the like.

As previously mentioned, it is possible that the relative spacing of at least two directing components is predefinable in a defined manner by means of the at least one first output. Both directing components can be coupled with the respective output, for instance, for the purpose of relative spacing, but it is also conceivable that only one of the two directing components is coupled with the respective output for the purpose of relative distance increase or distance decrease.

Alternatively or additionally, it is furthermore possible that a vertical positioning of the one or more directing components coupled to the at least one first output is predefinable in a defined manner by means of the at least one first output. A directing component can be coupled to a first output, for instance, for the purpose of relative spacing to at least one further directing component, with the same directing component being coupled to at least one second output for its vertical positioning. It is, however, also conceivable that a directing component is coupled with a first output, via at least two coupling means, for the purpose of a relative spacing to a further directing component and for its additional vertical positioning. In an embodiment involving a mechanical operative connection of the one output with a control actuator to be described in more detail in the following, it is possible for a relative spacing of the one directing component to a further directing component as well as its vertical positioning to be performed via the one output and synchronously under operative connection with the control actuator.

It is additionally provided that one or more further directing components are coupled to at least one second output of the transmission arrangement and can be positioned and/or oriented via the at least one second output. In this instance it is also possible that the coupling of the at least one second output with the one or more directing components is carried out via a cable pull connected to the at least one second output and to the one or more directing components and/or via a Bowden cable connected to the at least one second output and to the one or more directing components. It is furthermore possible that the spacing of the one or more directing components coupled to the at least one second output to further directing components is predefinable in a defined manner by means of the at least one second output. Alternatively or additionally, it is also possible that a vertical positioning of the one or more directing components coupled to the at least one second output is predefinable in a defined manner by means of the at least one second output.

In preferred embodiments, at least one third and/or more further outputs are moreover present, which are each coupled with one or more further directing components, wherein the directing components coupled to the respective output can be positioned and/or oriented via the respective output.

It is furthermore possible that at least two outputs, preferably, however, all outputs of the device, are arranged adjacent to each other and directly brought into a connection with their respectively adjacent output via one or more axial bearings for independent rotational movement. A first front output can in this instance furthermore be in connection to a housing of the device via one or more axial bearings. In addition, a rear output can be in connection to a housing of the device via one or more further axial bearings.

It is furthermore provided that the device comprises a control actuator, which can be selectively and mechanically brought into an operative connection with the at least one first output and/or with the at least one second output and/or with one or more further outputs for the purpose of orienting and/or positioning the one or more directing components coupled to the respective output.

The mechanical operative connection between control actuator and the respective output can moreover be designed to be selectively disconnectable. In the instance of a mechanical operative connection being present between the control actuator and the respective output, it can be provided that a mechanical coupling between the control actuator and the respective output is present, while in the instance of the mechanical operative connection between the control actuator and the respective output being disconnected, no mechanical coupling between the control actuator and the respective output is present. If the mechanical coupling is present, positioning and/or orienting of the one or more directing components coupled to the respective output can be carried out via the control actuator in such an embodiment. If no mechanical coupling to one or more of the outputs is present, positioning and/or orienting of the one or more directing components coupled to the one or more outputs cannot be carried out, even if the control actuator is activated.

In the instance of a mechanical operative connection between the control actuator and the at least one first output, it is moreover conceivable that a mechanical operative connection of the control actuator with at least one further output can be established at the same time. The control actuator can then be mechanically coupled to at least one first output and at least one further output via a drive shaft, for instance, while the control actuator is not mechanically coupled to one or more further outputs.

Moreover, it is possible in further embodiments that the control actuator can be mechanically brought into a connection with only one output in each case. In further embodiments it can moreover be provided that in the instance of a mechanical operative connection with one or more specific outputs, a mechanical operative connection with one or more further defined outputs is established at the same time, while in the instance of a mechanical operative connection with one or more further specific outputs no mechanical operative connection is established at the same time.

It is accordingly possible that under the simultaneous operative connection of the control actuator with the at least one first output and with at least one further output, the directing components coupled to the at least one first output can be positioned and/or oriented, via the control actuator, synchronously with the directing components coupled to the further output If the control actuator is mechanically brought into an operative connection with respectively one output one after the other, it is possible to carry out the orienting and/or positioning of several directing components one after the other by means of the device according to the invention.

In a preferred embodiment of the present invention, the control actuator can be selectively and mechanically brought into an operative connection with the at least one first output and/or with the at least one second output via a central drive shaft that is rotationally drivable via the control actuator. The central drive shaft can be rotationally drivable about its longitudinal axis via the control actuator. In this context it is conceivable that the operative connection between the control actuator and the respective output can be established by form lock of the drive shaft with the one or more respective outputs and/or by form lock of one or more engagement means or input means mounted on the drive shaft with the one or more respective outputs.

As previously mentioned, the mechanical operative connection between the control actuator and the respective mechanical output can be selectively disconnectable in a preferred embodiment. The form lock between the drive shaft and the respective output and/or the form lock between the one or more engagement means mounted on the drive shaft and the respective output can accordingly be designed to be selectively disconnectable.

It is moreover conceivable that the drive shaft or the control actuator together with the drive shaft can be selectively brought into an operative connection with the at least one first output and/or with the at least one second output by a shift that is essentially aligned with the direction of a longitudinal axis of the drive shaft. If the control actuator can be brought into an operative connection with the respective output by form lock of the drive shaft or by form lock of one or more engagement means mounted on the drive shaft, as described above, then it can be possible to establish the form lock via a shift of the drive shaft or via a shift of the drive shaft together with its engagement means mounted thereon.

For this purpose, the control actuator, together with the drive shaft, as the case may be, can be in connection with a housing of the device, for instance, via suitable bearings and preferably via slide bearings.

It is also possible, for the purpose of shifting the drive shaft, that said drive shaft or the control actuator together with the drive shaft are coupled to a guide carriage of a linear guiding means, which guide carriage is movable in relation to a housing section. The drive shaft can preferably be brought into a connection with the guide carriage via suitable bearings or rather axial bearings, which connection is rotationally relative to the guide carriage.

In a further preferred embodiment it is conceivable that the linear guide means comprises teeth extending sectionwise along the drive shaft and being shiftable together with the drive shaft, which teeth are designed to be non-rotational and are in engagement with one or more, preferably however with all of the outputs that are not mechanically brought into an operative connection with the control actuator. The teeth in this context can be designed as blocking means and non-rotationally fixate the respective outputs, which they are brought into engagement with, in their respective actual position. Due to the engagement with the teeth, an unintentional adjustment of one or more directing components via their respective outputs can thus be advantageously ruled out. It is also conceivable that an engagement of the teeth with both of the outputs is established during the transition of the mechanical operative connection from one of the first outputs to one of the second outputs.

As will be illustrated in more detail in the following, it is possible for the drive shaft to form external teeth and/or for one or more input means with external teeth to be mounted in a torque-proof manner on the drive shaft. By the engagement of the non-rotational teeth with the respective outputs and by the fixation in their respective actual positions, the drive shaft, together with its external teeth, or, as the case may be, the drive shaft and its input means with external teeth mounted thereon, can be guided through all outputs without any rotation of the drive shaft.

It is additionally conceivable that the shift of the drive shaft, together with the previously mentioned non-rotational teeth, as the case may be, or the shift of the control actuator together with the drive shaft and the non-rotational teeth, as the case may be, is carried out by means of a further actuator. In this instance, the further actuator can be stationarily connected to a housing of the device. It is thus possible to effect a movement of the control actuator or of the control actuator together with the drive shaft, which movement is relative to the housing of the device and effected in the longitudinal direction of the drive shaft. The further actuator and/or the control actuator can be designed as servomotors in a preferred embodiment. It is also conceivable that the further actuator and/or the control actuator are designed as stepper motors. It can be provided that both the further actuator and the control actuator are each designed as a stepper motor, for instance. The further actuator is thus provided for specifying the selective operative connection of the control actuator with the at least one first output and/or with the at least one second output.

The at least one first output and/or the at least one second output and/or further outputs can furthermore each form a reception for the drive shaft, through which reception the drive shaft enters or passes in the instance of an operative connection with the respective output. The at least one first output and the at least one second output and/or one or more further outputs can be arranged in such a manner that their receptions are aligned with each other.

In this embodiment, the drive shaft can be guided in a longitudinal direction through the respectively aligned receptions of the outputs. One or a plurality of the outputs can each be designed as a driven shaft or each have a driven shaft. The driven shaft and the drive shaft of one or more outputs or of all outputs can preferably also be aligned with each other.

In this context it is conceivable that the drive shaft together with respectively one output forms a respective planetary transmission, or a respective epicyclic transmission, as the case may be. The output can thus have a driven shaft, with the driven shaft and the drive shaft being aligned with each other. Further wheels for power transmission from the drive shaft onto the driven shaft and, in particular, gear wheels can be arranged between drive shaft and driven shaft. If a plurality of outputs comprises a driven shaft or if a plurality of outputs forms a driven shaft, several driven shafts or all driven shafts can be aligned with each other.

It is also possible that the one or more first outputs and/or the one or more second outputs are rotationally drivable by the drive shaft and each have internal teeth, which can be brought into engagement with corresponding counter-teeth of the central drive shaft and/or with corresponding counter-teeth of one or more input means mounted on the drive shaft. The corresponding counter-teeth of the drive shaft or of the one or more input means mounted on the drive shaft can thus be designed as external teeth. The outputs with their internal teeth and the drive shaft with its counter-teeth or the input means with their counter-teeth, which are mounted on the drive shaft, can be produced by laser processing.

In this context it is conceivable that the respective outputs and their internal teeth are flush aligned in the instance of a mechanical operative connection not being present such that the drive shaft with corresponding counter-teeth or the input means with corresponding counter-teeth, which are mounted on the drive shaft, can be brought into engagement with the one or more respective outputs by longitudinal shifting of the drive shaft and without further alignment.

It is also possible that the drive shaft forms a corresponding counter-teeth at least in one first partial section and at least in one second partial section along its longitudinal axis or that at least two input means are mounted in different positions on the drive shaft. The counter-teeth of the first and the second partial section or the two input means mounted in different positions on the drive shaft, as the case may be, can, in the instance of an operative connection between the control actuator and a plurality of outputs, each be mechanically coupled with the outputs at the same time.

The invention thus enables an adjustment of a plurality of directing components of a transport system via one single drive. In particular, the guide railing of a transport system frequently consists of a plurality of separate rail sections, which are each commonly adjusted individually by an own drive, or which have to be mechanically coupled to each other for an adjustment by means of only one drive. A simultaneous adjustment of straight and curved rail sections, for instance, is difficult or, in this instance, has to be carried out individually by means of separate outputs.

With the present invention it is now possible to adjust mechanically separate rail sections by means of the same drive. The invention is particularly preferably employed for adjusting the width of a conveyor line for article assemblies wrapped in packaging material before and/or in a shrinking device. In a shrinking device, it is in particular necessary that the article assemblies being fed in are arranged centered on the conveyor line and thus have the same distance to the shaft walls of the shrinking device on both sides, in order to attain the same shrinking result on both sides. The lateral guide railings have to be adjusted in dependence on the size or rather the width of the article assembly to ensure this centering. If article assemblies of a first width are first transported through the shrinking device orthogonally to the transport direction and subsequently article assemblies of a smaller second width, the distance of the guide railings to each other has to be accordingly decreased so that the article assemblies of the smaller second width are also arranged centered on the conveyor line and so that they are not conveyed closer along one side of the shaft walls, as the case may be.

The adjustment of the guide railings to each other via the above-described device can be carried out fully automatically. It is possible to provide sensor monitoring, for instance. In particular, a detection unit is provided prior to the infeed section of the shrinking device, which detection unit identifies the width of the article assemblies and further parameters thereof, as the case may be. The detection unit can be a sensory apparatus, for instance, with an image sensor or the like. The detection unit transmits the recorded data to a control unit, which identifies the required distance between the guide railings based on the recorded width etc. of the article assembly, and which accordingly controls the device for positioning and/or orienting so that the rail sections of the guide railing can be accordingly adjusted via the described transmission arrangement. The control unit in particular controls the control actuator and/or the drive shaft and causes the control actuator to be selectively brought into a mechanical operative connection with one of the outputs.

It is furthermore conceivable that in the instance of a present mechanical operative connection with the at least one first output, the drive shaft can be mechanically brought into an operative connection with at least one further output by a shift that is essentially aligned with the direction of a longitudinal axis of the drive shaft, wherein the mechanical operative connection between the at least one first output remains established during and after the shift.

In the following passages, the attached figures further illustrate exemplary embodiments of the invention and its advantages. The size ratios of the individual elements in the figures do not necessarily reflect the real size ratios. It is to be understood that in some embodiments various aspects of the invention may be shown exaggerated or enlarged in relation to other elements to facilitate an understanding of the invention.

DETAILED DESCRIPTION OF THE INVENTION

Figure 1:
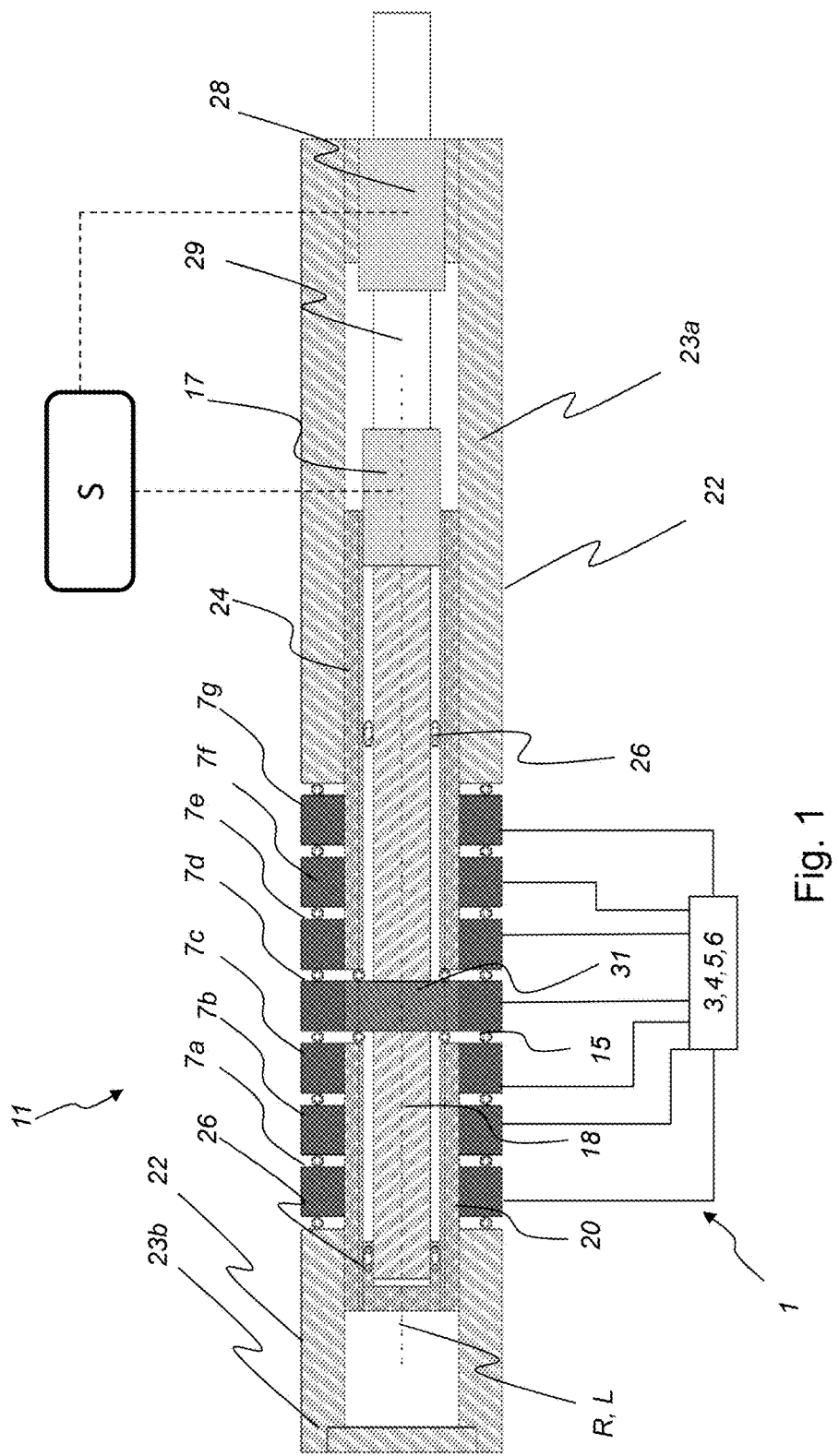
FIG. 1 shows a schematic cross-sectional illustration of an embodiment of a device 1 according to the invention.

The same or equivalent elements of the invention are designated by identical reference characters. Furthermore and for the sake of clarity, only the reference characters relevant for describing the respective figure are provided. It should be understood that the detailed description and specific examples of the device according to the invention, while indicating preferred embodiments, are intended for purposes of illustration only and are not intended to limit the scope of the invention.

FIG. 1 shows a schematic cross-sectional illustration of an embodiment of a device 1 according to the invention. The device 1 is provided for selectively positioning directing components 3, 4, 5, and 6 of a transport system 10, which directing components 3, 4, 5, and 6 are provided for guiding articles 8 along their respective transport path T1, T2, or T3 (cf. FIG. 2).

In the embodiment shown, each of the directing components 3, 3', 3", and 3''' as well as 4, 4', 4", and 4''' and 5, 5', 5", and 5''' as well as 6, 6', 6", and 6''' is respectively coupled with an own output 7a to 7g and is thus adjustable via the respectively assigned output 7a to 7g. For the purpose of clarity, the embodiment shown in FIG. 1 only comprises seven illustrated outputs 7a to 7g. In practice, however, embodiments can be employed in which more or less than seven outputs 7a to 7g are present. Up to 25 outputs 7a to 7g can be present, for instance.

It is also possible that a plurality of directing components 3, 4, 5, 6 are each coupled with one of the outputs 7a to 7g. For instance, two first directing components 3 and 3' (cf. FIG. 2) can be coupled to a first output 7a, while two further first directing components 3" and 3''' are coupled to a second output 7b.

All outputs 7a to 7g can rotate about the common rotational axis R independently of each other and upon mechanical operative connection with the control actuator 17.

Figure 3:
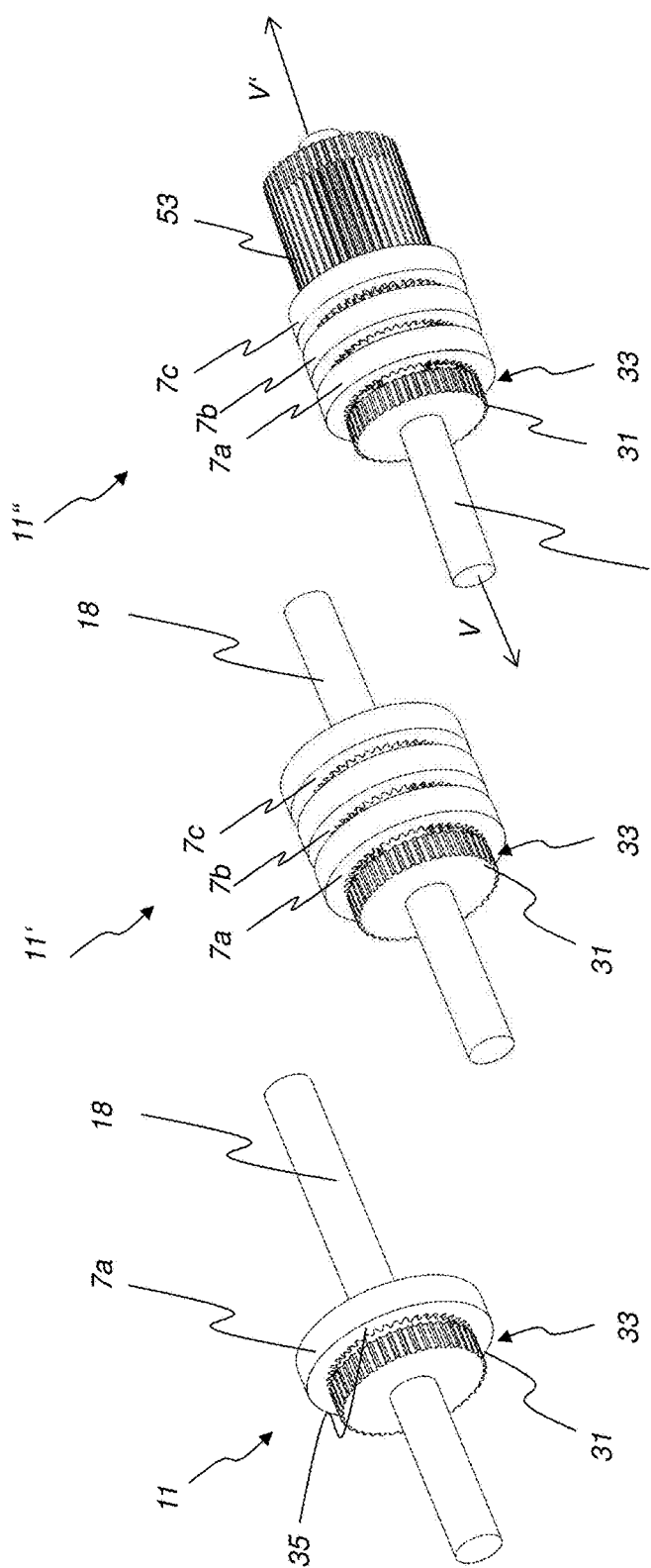
FIGS. 3A to 3C each show a transmission arrangement as can be employed for an embodiment of a device according to the invention.

For the selective mechanical operative connection, the control actuator 17 is in connection with a drive shaft 18, which can be driven rotatably about the rotational axis R via the control actuator 17. Also illustrated is an input means 31, which is connected to the drive shaft 18 in a torque-proof manner and mounted on the drive shaft 18, and which is designed as a gear wheel with external teeth 33 in the present illustrations (cf. FIGS. 3 to 5). The input means 31 or the drive shaft 18 mounted on the gear wheel can be selectively and form-lockingly brought into engagement with one of the outputs 7*a* to 7*g*.

For the independent rotational movement about the rotational axis R, the outputs 7*a* to 7*g* are in connection with their respectively adjacent outputs 7*a* to 7*g*, each via an axial bearing 15. The axial bearings 15 and the outputs 7*a* to 7*g* as well as the drive shaft 18, together with the input means 31 mounted on the drive shaft 18, form the transmission arrangement 11. The rotational axis R extends in the longitudinal direction L of the drive shaft 18.

For the purpose of changing the engagement of the input means 31 to one of the further outputs 7*a* to 7*g* or for the purpose of establishing selective operative connection with one of the further outputs 7*a* to 7*g*, the control actuator 17 is shiftable together with the drive shaft 18 in and against the longitudinal direction L of the drive shaft 18. For this purpose, the control actuator 17 and the drive shaft 18 are in connection with a carriage 20, which, together with a housing 22, forms a linear guiding means. The carriage 20 is moved together with the drive shaft 18 and the control actuator 17 relative to the housing 22 and is brought into a connection with the housing 22 via slide bearings 24 for this purpose. Although not illustrated in FIG. 1, it is conceivable and further disclosed in FIG. 3C that non-rotational teeth 53 are in connection with the linear guiding means, which non-rotational teeth 53 are shiftable together with the drive shaft 18 and via the control actuator 17 in and against the longitudinal direction L. In this context, the non-rotational teeth 53 can be in a form-locking engagement with all outputs 7*a* to 7*g* that are brought into an engagement with the input means 31, with the respective outputs 7*a* to 7*g* being held non-rotationally in their respective actual position via the teeth 53. The slide bearing 24 can, for instance, be designed as hollow shaft and have external teeth that cannot be rotated together with the drive shaft 18. It is conceivable in this context that, prior to changing the engagement of the input means 31 with one of the outputs 7*a* to 7*g* to one of the further outputs 7*a* to 7*g*, a flush alignment of the input means 31 with its external teeth 33 (cf. FIG. 3) is established under consideration of the non-rotational teeth 53.

As is also discernible from FIG. 1, the housing 22 is formed by a first housing section 23*a* and a second housing section 23*b*, with the transmission arrangement 11 being arranged between the two housing sections 23*a* and 23*b*.

The shifting of the carriage 20 and of the control actuator 17 together with its drive shaft 18 is effected via a further actuator 28 in the exemplary embodiment in FIG. 1. The further actuator 28 and the control actuator 17 take the form of servomotors or stepper motors. The further actuator 28 is arranged in a stationary position at the housing 3 or rather at the first housing section 23*a*.

In order to move the carriage 20, the further actuator 28 is brought into connection with the control actuator 17 via a lift pin 29. The further actuator 28 can move the lift pin 29 in its longitudinal direction and also in the longitudinal direction L of the drive shaft 18. The drive shaft 28 and the lift pin 29 can thus be aligned with each other.

In FIG. 1, the control actuator 17 is mechanically brought into an operative connection with the output 7*d* via the drive shaft 18 such that the adjustment of the one or more directing components coupled with the output 7*d* would now be possible upon actuating the control actuator 17 and the resulting rotation of the drive shaft 18 together with the input means 31 mounted torque-proofly on the drive shaft 18. If this is supposed to be followed up, for example, by the adjustment of one or more further directing components 3, 4, 5, 6, which are, for example, coupled with the output 7*c*, then it would be necessary to first shift the carriage 20 and the control actuator 17 arranged on the carriage 20, together with the drive shaft 18 and the input means 31, by a defined distance in the longitudinal direction L of the drive shaft 18 by means of the actuator 28 and the lift pin 29. Provided that the drive shaft 18 or one or more input means 31 mounted on the drive shaft 18 are in a mechanical and form-locking connection with the output 7*c* as a result of the shift, an adjustment of the one or more directing components 3, 4, 5, or 6 coupled with the output 7*c* could be carried out on actuating the control actuator 17.

While not clearly discernible form FIG. 1, the following figures nevertheless show that the outputs 7*a* to 7*g* are designed as driven shafts, which are flush aligned with the drive shaft 18.

If the input means 31 or the drive shaft 18 is mechanically brought into an operative connection with one of the outputs 7*a* to 7*g*, the respective output 7*a* to 7*g* rotates together with the drive shaft 18 at a homogeneous frequency when the control actuator 17 is actuated.

Also discernible is a control unit S, which is in connection with the control actuator 17 and with the further actuator 28, and the functional principle of which will be explained in more detail in the following description for FIG. 4.

Figure 2:
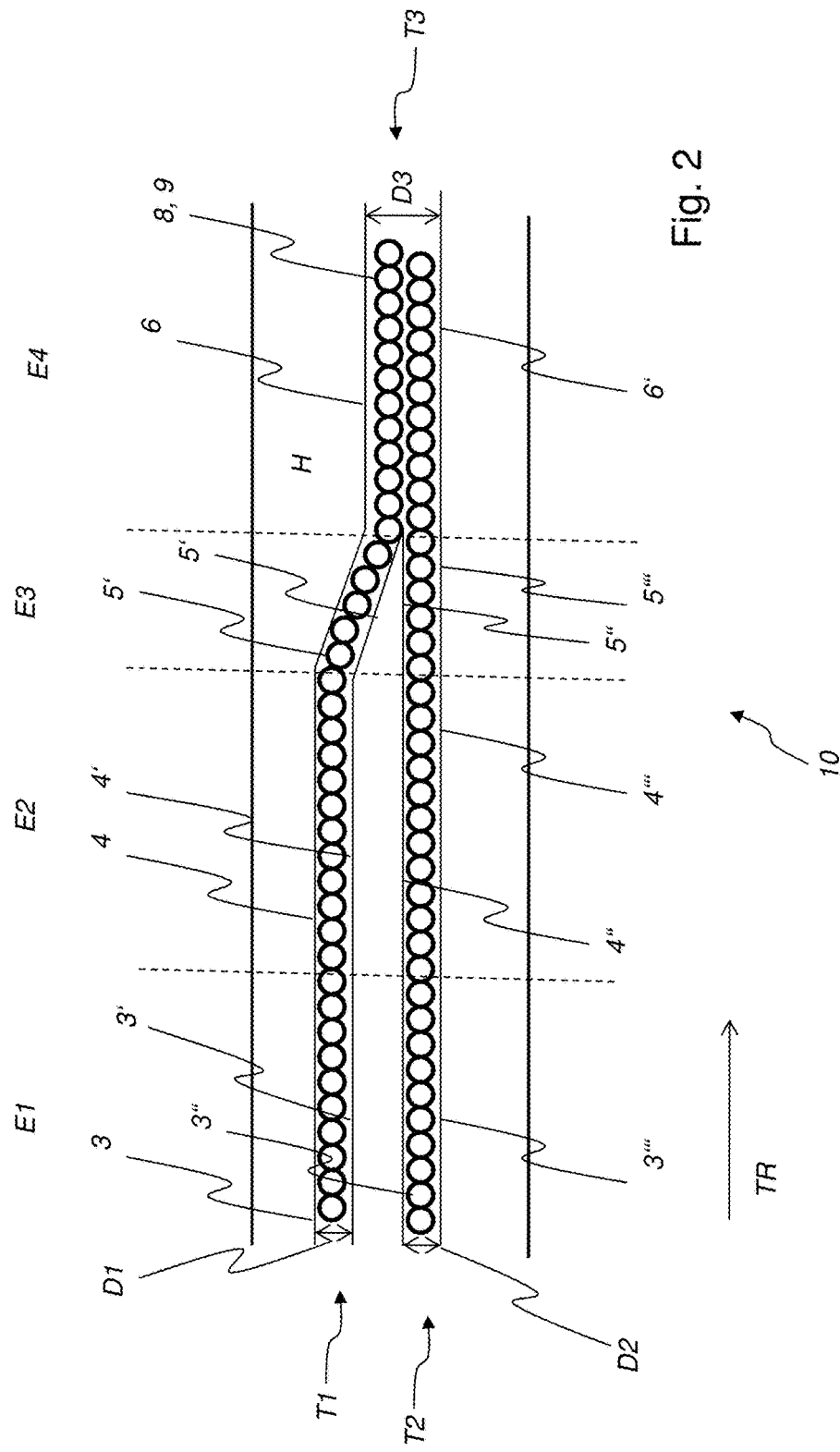
FIG. 2 shows a schematic top view of an embodiment of a transport system with the appropriate directing components, for which the orienting by means of the device according to the invention can be effected.

FIG. 2 shows a schematic top view of an embodiment of a transport system 10 with the appropriate directing components 3, 4, 5, and 6, for which the orienting by means of the device 1 according to the invention can be effected. Within the transport system 10 of FIG. 2, articles 8 are being transported in the transport direction TR. One or more packaging apparatuses (not illustrated here) and/or one or more filling apparatuses (not illustrated here), for instance, can be present in the range of the transport system 10, which apparatuses apply packaging material to the articles 8 or to the containers 9 or fill them with a liquid medium.

The transport is carried out via a horizontal conveying device H along the entire transport route, with the articles 8 or the containers 9 standing upright on the horizontal conveying device H.

The articles 8 of transport path T1 and the articles 8 of transport path T2 both have an identical article geometry or an identical article diameter. For this reason, the articles 8 or containers 9 in the transport path T3 resulting from the first transport path T1 and from the second transport path T2 are also of the same article geometry.

In the present instance, the relative distances D1, D2, and D3 of the respective directing components 3, 4, 5, and 6 are selected such that the articles 8 or the containers 9 can be transported in the respective transport path T1, T2, and T3 without jamming or toppling.

Under consideration of the first section E1 of the transport system 10, the relative distance of two first directing components 3 and 3' corresponds to slightly more than the maximum diameter of the articles 8 or containers 9 being transported between the directing components 3 and 3'. As already mentioned above, the articles 8 or containers 9 to be transported between the further first directing components 3" and 3''' are identically designed with regard to the maximum article diameter, such that: D1≈D2. Consequently, the relative distance of the directing components 4 and 4' as well as 4" and 4''' and also 5 and 5' as well as 5" and 5''' is designed identical to the relative distance of the directing components 3 and 3' due to the common forming transport path T1 and T2.

As in each case two articles 8 are transported next to each other in the transport path T3, and as jamming as well as toppling of the articles 9 is still to be prevented, it is possible to moreover determine the following for the distance of the directing components 6 and 6': D3≈D1+D2.

If further articles 8 or containers 9 are to be transported after the performed transport, which articles 8 or containers 9 have a larger or smaller maximum diameter than the articles illustrated in FIG. 2, it is necessary to adjust the relative distance of the respective two directing components 3, 4, 5, and 6 that pairwisely guide the articles 8 or containers 9 along the respective section E1, E2, E3, and E4, in order to prevent jamming or toppling of the respective articles 8 or containers 9.

Under consideration of the two directing components 3 and 3' of the first section E1, it can be provided, for example, that only the directing component 3' is coupled with an output 7*a* to 7*g* and that the relative distance of the two directing components 3 and 3' can be increased or decreased via the above described control actuator 17 (cf. FIG. 1) under actuation of the respective output 7*a* to 7*g*.

It can also be provided that both the directing component 3' and the directing component 3 are respectively coupled with an own output 7*a* to 7*g* and that the relative distance of the two directing components 3 and 3' is adjusted simultaneously or consecutively by mechanically bringing the control actuator 17 into an operative connection with the respective outputs 7*a* to 7*g*.

For the purpose of clarification it should furthermore be noted that both the directing component 3 and the directing component 3' can be coupled with a common output 7*a* to 7*g*, with the directing components 3 and 3' being synchronously adjusted, or the relative distance of the directing components 3 and 3' being synchronously increased or decreased, under mechanical operative connection of the respective output 7*a* to 7*g* with the control actuator 17. In each case, only one control actuator 17 is necessary for adjusting the transport system 10 and its directing components 3, 4, 5, and 6 to different article diameters, which control actuator 17 can perform the positioning of the directing components 3, 4, 5, and 6 under selective operative connection with the respective outputs 7*a* to 7*g* in such a manner that the articles 8 or containers 9 can be transported along the sections E1 to E4 without toppling or jamming.

As additionally shown in FIG. 2, a plurality of first directing components 3" and 3''' of the first section E1, a plurality of second directing components 4" and 4''' of the second section E2, and a plurality of third directing components 5" and 5''' of the third section E3 can form a common transport path T2. For this purpose, the relative distance between the two first directing components 3" and 3''' is formed identical to the relative distance of the two second directing components 4" and 4''' identical to the relative distance of the two third directing components 5" and 5'''. The identical distances are also retained after adjustment of the transport system 10 and its directing component 3, 4, 5, and 6 to further articles 8 with decreased or increased maximum article diameters.

FIGS. 3A to 3C each show a transmission arrangement 11 or 11' or 11" as can be employed for an embodiment of a device 1 (cf. FIG. 1) according to the invention.

As already previously described for the exemplary embodiment of FIG. 1, the transmission arrangement 11 or 11' or 11" is each composed of a drive shaft 18, one or more input means 31 mounted on the drive shaft 18, and a plurality of outputs 7*a* to 7*g*, the outputs 7*a* to 7*c* of which are illustrated in the FIGS. 3B and 3C. The illustration of the outputs 7*d* to 7*g* was omitted in the FIGS. 3B and 3C for the purpose of clarity. FIG. 3A shows only the output 7*a*.

The input means 31 each take the form of gear wheels and they each have external teeth 33. It is also discernible from the FIGS. 3A to 3C that the outputs 7*a* to 7*c* are designed as driven shafts and each have internal teeth 35 (cf. also FIG. 4) formed to correspond to the external teeth 33 of the input means 31.

The outputs 7*a* to 7*c* or the driven shafts, respectively, are aligned with the drive shaft 18 such that the drive shaft 18 can be passed through the outputs 7*a* to 7*c* or through the driven shafts, respectively.

As the drive shaft 18 is coupled with the control actuator 17 (cf. FIG. 1), the reception of the input means 31 in the one or more outputs 7*a* to 7*c* results in a form lock between the external teeth 33 or 33' of the respective input means 31 and the corresponding internal teeth 35 of the respective output 7*a* to 7*c*. A mechanical operative connection between the control actuator 17 and the one or more respective outputs 7*a* to 7*c* is produced with a form lock.

As is discernible from the exemplary embodiment in FIG. 3B, only one input means 31 is mounted on the drive shaft 18, which input means 31 can be consecutively brought into an engagement with respectively one of the outputs 7*a* to 7*c* or with respectively internal teeth 33 of the outputs 7*a* to 7*c*. In the embodiment shown in FIG. 3B, the one or more directing components 3, 4, 5, or 6 coupled with an output 7*a* to 7*c* are therefore each adjustable.

In FIG. 3C, an exemplary embodiment for a transmission arrangement 11" is moreover discernible, for which non-rotational teeth 53 is illustrated, which is designed to be shiftable together with the drive shaft 18 in the longitudinal direction of the drive shaft 18 or in the direction of the arrows V and V'. The non-rotational teeth 53 is, however, not torque-proofly connected with the drive shaft 18, so that no rotation of the non-rotational teeth 53 results from a rotation of the drive shaft 18. The non-rotational teeth 53 can be in connection with the drive shaft 18 via the radial bearing 26 (cf. FIG. 1), for instance. As previously mentioned in describing the exemplary embodiment in FIG. 1, the non-rotational teeth 53 can be in engagement with all outputs 7*a* to 7*g* that are not brought into engagement with the external teeth 33 of the one or more input means 31. An unintentional rotation of one or more outputs 7*a* to 7*g* and a concurrent unintentional adjustment of directing component 3, 4, 5, and/or 6 can be ruled out in this embodiment.

Not illustrated in FIG. 3C, but additionally conceivable is that the non-rotational teeth 53 are designed as a gear wheel system, which immediately adjoins the one or more input means, in the present instance the input means 31, on both sides. The gear wheel system can thus be brought into engagement with one of the first outputs 7*a* to 7*c* and with at least one of the second outputs 7*a* to 7*c* when the drive shaft 18 is shifted in the longitudinal direction or in the direction of the arrows V and V' and a transition from one of the first outputs 7*a* to 7*c* to one of the second outputs 7*a* to 7*c* occurs. An unintentional rotation of the first of the outputs 7*a* to 7*c* and/or of the second of the outputs 7*a* to 7*c* during the transition can be ruled out due to the engagement of the non-rotational gear wheel system.

A further advantageous effect resulting from the embodiment according to FIG. 3C is to be found in the fact that the respective outputs 7*a* to 7*c* with their internal teeth 35 are flush aligned due to the engagement of the outputs 7*a* to 7*c* with the non-rotational teeth 53. The input means 31 can thus be passed through the outputs 7a to 7g by means of a movement of the drive shaft 18 in the longitudinal direction or in the direction of the arrows V and V' without a previous rotation of the drive shaft 18 for orienting the external teeth 33 having to be carried out.

Figure 4:
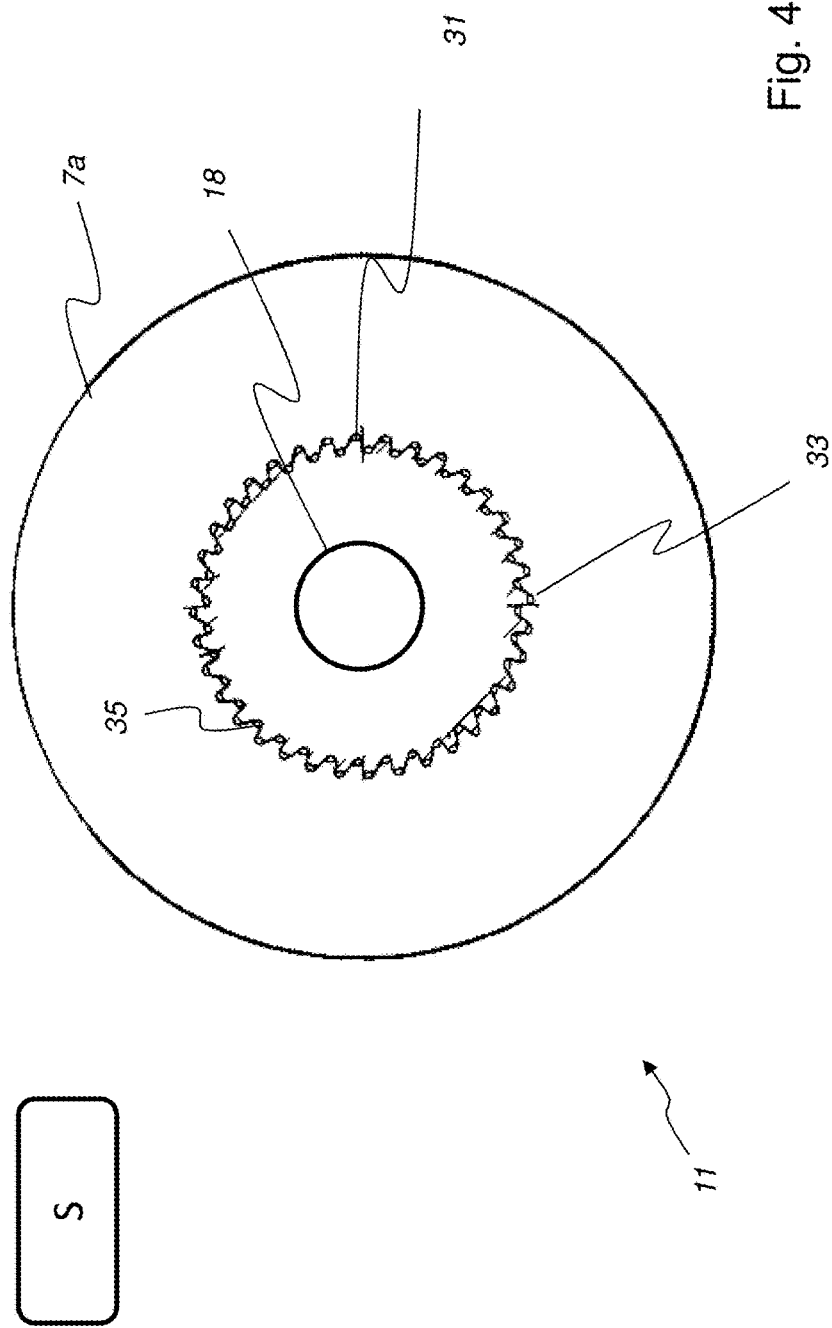
FIG. 4 shows a cross section through a transmission arrangement according to the FIGS. 3A to 3C as can be employed for an embodiment of a device according to the invention.

FIG. 4 shows a cross section through a transmission arrangement 11, 11', or 11" according to the FIGS. 3A to 3C as can be employed for an embodiment of a device 1 according to the invention.

Discernible from the cross section in FIG. 4, too, are the drive shaft 18, the input means 31 that is torque-proofly connected with the drive shaft 18 and mounted on the drive shaft 18 with external teeth 33 and the output 7a that is designed as shaft.

In FIG. 4, the input means 31 with its external teeth 33 are brought into a form-locking engagement with the output 7a and its internal teeth 35.

The control unit S from FIG. 1 is symbolically rendered once again. If it is intended to disconnect the form-locking engagement of the input means 31 with the output 7a by shifting the drive shaft 18 along its longitudinal direction V or V' (cf. FIG. 3C) and to establish a form-locking engagement of the input means 31 with one of the further outputs 7b to 7g, the external teeth 33 of the input means 31 and the internal teeth 35 of the respective output 7b to 7g have to be oriented to each other such that a form-locking engagement of the internal teeth 35 with the external teeth 35 can be established by shifting the drive shaft 18 in its longitudinal direction V or V'.

The control unit S therefore has the task of performing a rotation of the respective output 7a to 7g under an mechanical operative connection of the control actuator 17 with one of the outputs 7a to 7g or under engagement of the input means 31 with one of the outputs 7a to 7g, as the case may be, such that, after the performed rotation, the engagement of the input means 31 with the respective output 7a to 7g is disconnected and the input means 31 can be brought into engagement with one or more of the outputs 7a to 7g by a longitudinal shift of the drive shaft 18. For this purpose, the control unit S is coupled with the control actuator 17 and with the further actuator 18, which carries out the longitudinal shift of the drive shaft 18.

The respective outputs 7a to 7g that are not in engagement with the input means 31 can have a predefined orientation, which is predetermined by their engagement with the non-rotational teeth 53 (cf. FIG. 3C).

Figure 5:
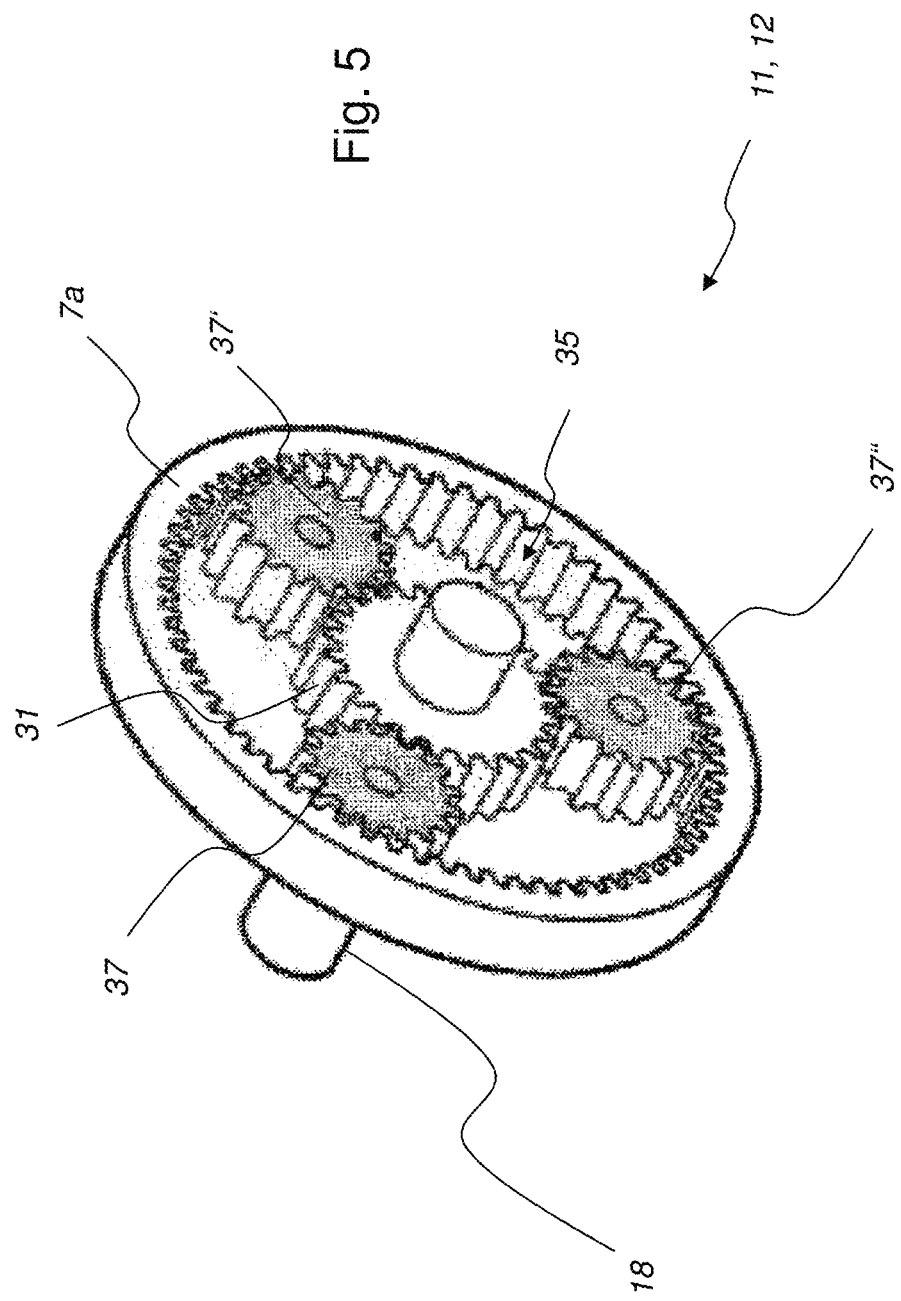
FIG. 5 shows a further exemplary embodiment of a transmission arrangement as can be employed for an embodiment of a device according to the invention.

FIG. 5 shows a further exemplary embodiment of a transmission arrangement 11 as can be employed for an embodiment of a device 1 according to the invention. Compared to the transmission arrangements 11, 11', and 11" shown in the FIG. 3, the transmission 11 designed as planetary transmission 12 in FIG. 5 in some cases offers the advantage of a possible transmission of high torques.

Furthermore and for the purpose of clarity, only one output 7a is illustrated in FIG. 5. It is clear to the addressed expert, however, that in an embodiment of a transmission arrangement 11 as shown in FIG. 5, a plurality of further outputs 7c to 7g can also be present, which can be brought into engagement with the input means 31 or with further input means 31 mounted on the drive shaft 18 and torque-proofly connected with the drive shaft 18 by a longitudinal shift of the drive shaft 18.

The planetary transmission 12 comprises a plurality of further gear wheels 37, 37', and 37", via which the input means 31 mounted on the drive shaft 18 is coupled with the output 7a for the purpose of torque transmission.

Figure 6:
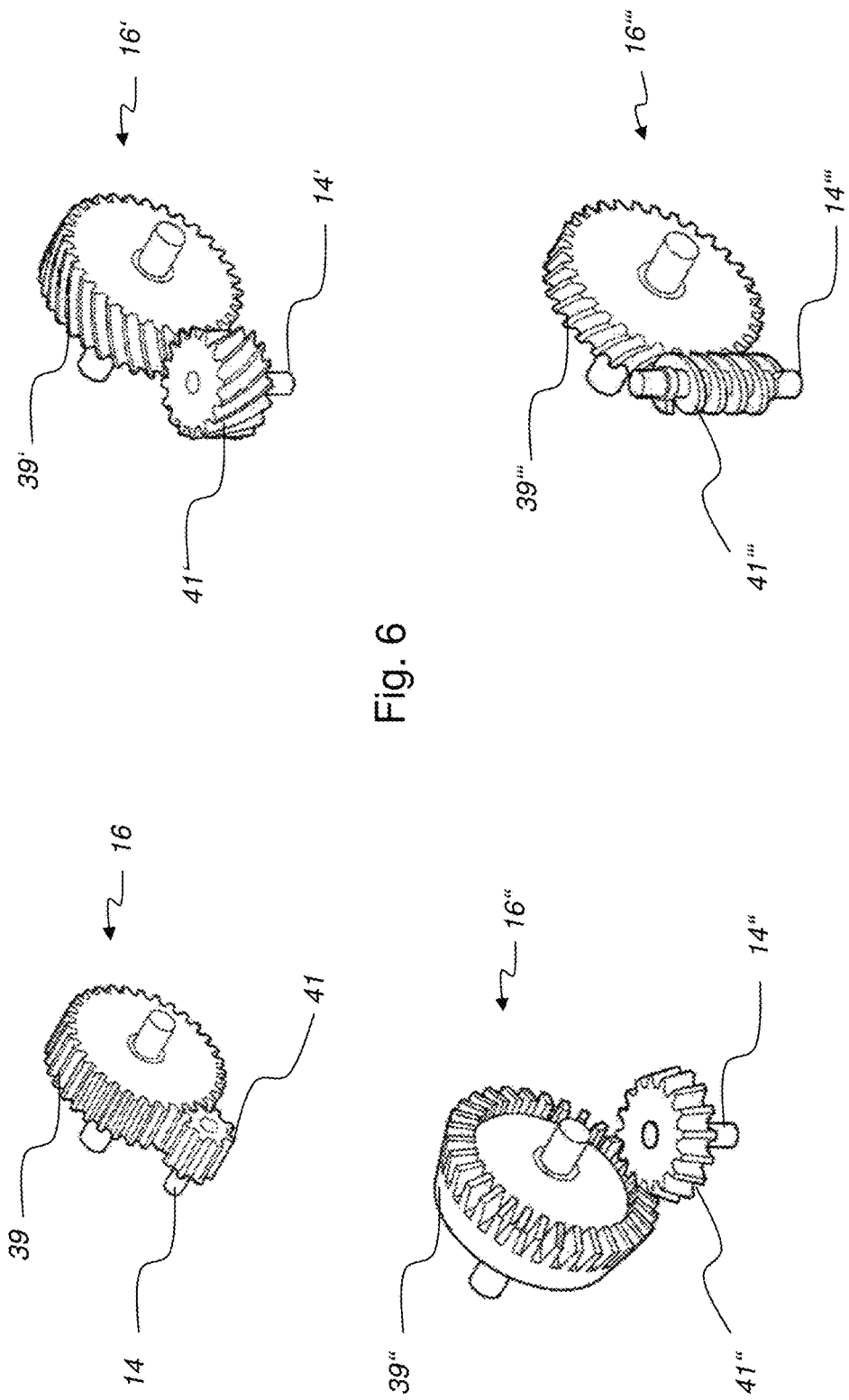
FIG. 6 shows a plurality of gear wheel mechanisms as can be provided for connecting one or more outputs to the respective one or more directing components.

FIG. 6 shows a plurality of gear wheel mechanisms 16, 16', 16", 16''' as can be provided for connecting one or more outputs 7a to 7g with the respective one or more directing components 3, 4, 5, and/or 6.

The outputs 7a to 7g (cf. FIGS. 1 and 3) can have external teeth, for example, which is brought into engagement with external teeth of a first gear wheel 39, 39', 39", or 39''' of the respective gear wheel mechanism 16, 16', 16", or 16'''.

The first gear wheel 39, 39', 39", or 39''' can be coupled to a further gear wheel 41, 41', 41", or 41''', which is torque-proofly connected with a further shaft 14, 14', 14", or 14'''.

Flexible cable elements (cf. FIG. 7), for instance, can be coupled to the shaft 14, 14', 14", or 14''', which cable elements are in connection with the respective directing components 3, 4, 5, or 6.

FIG. 7 show a plurality of flexible cable elements as can be provided for coupling one or a plurality of the outputs to one or a plurality of the directing components 3, 4, 5, 6.

A sprocket wheel 43 is thus illustrated in FIG. 7, which sprocket wheel is in connection with one or more directing components 3, 4, 5, or 6 via a chain 45. The sprocket wheel 43 has a recess 47, into which, for instance, the further shaft 14 illustrated in FIG. 6 can engage and be torque-proofly connected with the sprocket wheel 43.

Figure 7C:
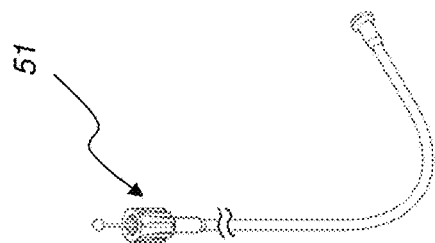
FIG. 7 show a plurality of flexible cable elements as can be provided for coupling one or a plurality of the outputs to one or a plurality of the directing components.
Figure 7B:
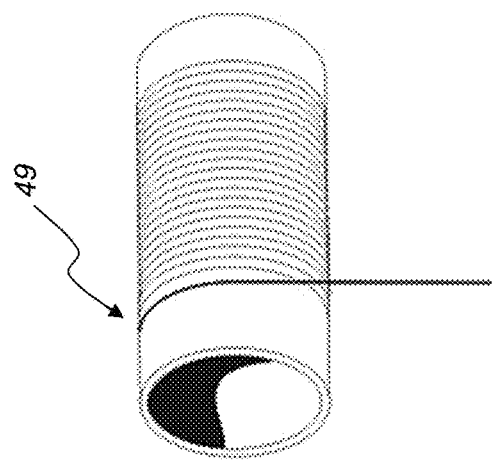
Figure 7A:
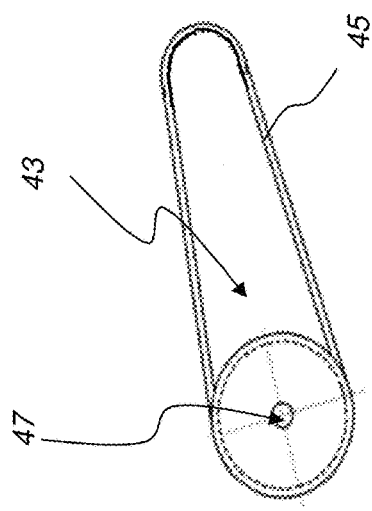

The reference characters 49 and 51 of the FIGS. 7B and 7C refer to a cable drum and to a Bowden cable. Additionally or alternatively to the sprocket wheel 43 shown in FIG. 7A, a cable drum 49 and/or a Bowden cable can also be in connection with a further shaft 14 and the respective directing components 3, 4, 5, or 6 in other embodiments of the present invention.

It is clear for the addressed expert that the flexible cable elements as shown in the FIG. 7 represent only an exemplary possibility of coupling outputs 7a to 7g with directing components 3, 4, 5, or 6. Moreover, further alternative or additional mechanisms can be provided in practice, which are known and thus not explicitly mentioned here.

The invention has been described with reference to a preferred embodiment. Those skilled in the art will appreciate that numerous changes and modifications can be made to the preferred embodiments of the invention and that such changes and modifications can be made without departing from the spirit of the invention. It is, therefore, intended that the appended claims cover all such equivalent variations as fall within the true spirit and scope of the invention.

LIST OF REFERENCE CHARACTERS

1 Device
3 Directing component
4 Directing component
5 Directing component
6 Directing component
7 Output
8 Article
9 Container
10 Transport system
12 Planetary transmission
14 Further shaft
15 Axial bearing
16 Gear wheel mechanism
17 Control actuator
18 Drive shaft
20 Carriage
22 Housing
23 Housing section 24 Slide bearing
26 Radial bearing
28 Further actuator
29 Lift pin
31 Input means
33 External teeth
35 Internal teeth
37 Gear wheel
39 First gear wheel
41 Further gear wheel
43 Sprocket wheel
47 Recess
49 Cable Drum
51 Bowden Cable
53 Non-rotational teeth
E Section
L Longitudinal direction
R Rotational axis
S Control device
T1 Transport path
T2 Transport path
T3 Transport path
V Shifting direction

The invention claimed is:

1. A device (1) for positioning and/or orienting one or more adjustable directing components (3, 4, 5, 6) for steering and/or guiding articles (8) in a transport system (10), comprising:
one or more directing components (3, 4, 5, 6) coupled to at least one first output (7a to 7g) of a transmission arrangement (11) and positionable and/or orientable via the at least one first output (7a to 7g)
one or more further directing components (3, 4, 5, 6) coupled to at least one second output (7a to 7g) of the transmission arrangement (11) and positionable and/or orientable via the at least one second output (7a to 7g); and
a control actuator (17), wherein the control actuator (17) is selectively and mechanically connected and disconnected from the at least one first output (7a to 7g) and/or from the at least one second output (7a to 7g) via a central drive shaft (18), wherein the central drive shaft (18) is rotationally drivable via the control actuator (17), to orient and/or position the one or more directing components (3, 4, 5, 6) or the one or more further directing components (3, 4, 5, 6) coupled with the respective first or second output (7a to 7g).

2. The device (1) of claim 1, wherein the drive shaft (18), or the control actuator (17) together with the drive shaft (18), is selectively brought into an operative connection with the at least one first output (7a to 7g) and/or with the at least one second output (7a to 7g) by a shift of the drive shaft (18) that is aligned with the direction (V, V') of a longitudinal axis of the drive shaft (18).

3. The device (1) of claim 2, wherein the drive shaft (18), or the control actuator (17) together with the drive shaft (18), are coupled to a guide carriage (20) of a linear guiding means, wherein guide carriage (20) is movable in relation to a housing (22).

4. The device (1) of claim 3, wherein the linear guiding means comprises teeth (53) extending sectionwise along the drive shaft (18) and being shiftable together with the drive shaft (18), wherein teeth (53) are designed to be non-rotational and are in engagement with one or more of the outputs (7a to 7g) that are not mechanically brought into an operative connection with the control actuator (17).

5. The device (1) of claim 4, wherein the shift of the drive shaft (18), or the shift of the control actuator (17) together with the drive shaft (18), is carried out by a further actuator (28).

6. The device (1) of claim 5, wherein the further actuator (28) is stationarily connected to the housing (22).

7. The device (1) of claim 6, in which the at least one first output (7a to 7g) and/or the at least one second output (7a to 7g) each form a reception for the drive shaft (18), through which reception the drive shaft (18) enters or passes in the instance of an operative connection with the respective output (7a to 7g).

8. The device (1) of claim 7, wherein the reception of the at least one first output (7a to 7g) and the reception of the at least one second output (7a to 7g) are arranged in such a manner that they are aligned with each other.

9. The device (1) of claim 8, wherein the at least one first output (7a to 7g) and/or the at least one second output (7a to 7g) are rotationally drivable by the drive shaft (18) and each have internal teeth (35), which, for the mechanical operative connection, is brought into engagement with corresponding counterteeth (33) of the central drive shaft (18) and/or with corresponding counterteeth (33) of one or more input means (31) mounted on the drive shaft (18).

10. The device (1) of claim 9, wherein the drive shaft (18) forms corresponding counterteeth (33) at least in one first partial section and at least in one second partial section along its longitudinal axis, or in which at least two input means (31') are mounted in different positions on the drive shaft (18).

11. The device (1) of claim 10, wherein the at least one first output (7a to 7g) and the at least one second output (7a to 7g) are designed to be rotationally independent of each other and have a common rotational axis (R), which rotational axis (R) runs essentially in the longitudinal direction of the drive shaft (18).

12. The device (1) of claim 11, wherein at least two outputs (7a to 7g) are arranged adjacent to each other and, for independent rotational movement, are directly brought into a connection with their respectively adjacent output (7a to 7g) via one or more axial bearings (15).

13. The device (1) of claim 12, wherein the control actuator (17) and/or the further actuator (18) comprises servomotors and/or stepper motors.

14. The device (1) of claim 13, wherein the at least one first output (7a to 7g) and/or the at least one second output (7a to 7g) are coupled with the one or more directing components (3, 4, 5, 6), respectively, via one or more flexible cable elements.

15. The device (1) of claim 13, further comprising at least one third output (7a to 7g) and/or a plurality of further outputs (7a to 7g), wherein each are coupled with one or more further directing components (3, 4, 5, 6) and with which the control actuator (17) is mechanically brought into an operative connection for orienting and/or positioning the one or more directing components (3, 4, 5, 6) coupled with the respective output (7a to 7g).

16. The device (1) of claim 15, further comprising constituent parts to form a packaging facility for articles and/or a filling facility for articles (8) designed as containers (9) with a liquid medium.

17. The device (1) of claim 4 wherein the teeth (53) are in engagement with all of the outputs (7a to 7g).

18. The device (1) of claim 12, wherein all outputs (7a to 7g) are arranged adjacent to each other.

19. The device (1) of claim 14 wherein the one or more flexible cable elements comprise a Bowden cable (51), a cable pull (49), or a chain (45).

20. The device (1) of claim 1 wherein the one or more directing components (3, 4, 5, 6) are independently positionable and/or orientable from the one or more further directing components (3, 4, 5, 6).

* * * * *